United States Patent [19]
Yamaguchi

[11] 3,873,137
[45] Mar. 25, 1975

[54] BELLOWS-TYPE JOINT ASSEMBLY

[76] Inventor: Seiichi Yamaguchi, 11-2 Asagaya Minami 1-chome, Suginami-ku, Tokyo, Japan

[22] Filed: Sept. 19, 1973

[21] Appl. No.: 398,865

[52] U.S. Cl. ................................. 285/226, 285/235
[51] Int. Cl. ................................................ F18l 21/00
[58] Field of Search ............ 285/57, 226, 235, 236, 285/DIG. 4, DIG. 22, 242, 244

[56] References Cited
UNITED STATES PATENTS

| | | | |
|---|---|---|---|
| 961,685 | 6/1910 | Cosgrove | 285/57 X |
| 2,793,057 | 5/1957 | McGugin | 285/242 X |
| 2,920,656 | 1/1960 | Bertolet | 285/226 X |
| 3,043,612 | 7/1962 | Pavlik et al. | 285/236 X |
| 3,336,950 | 8/1967 | Fochler | 285/226 X |
| 3,411,157 | 11/1968 | Rabenhorst | 285/226 X |
| 3,549,176 | 12/1970 | Contreras | 285/226 X |

FOREIGN PATENTS OR APPLICATIONS

| | | | |
|---|---|---|---|
| 327,483 | 7/1935 | Italy | 285/244 |
| 172,992 | 11/1934 | Switzerland | 285/235 |

*Primary Examiner*—Alfred R. Guest
*Attorney, Agent, or Firm*—Oblon, Fisher, Spivak, McClelland & Maier

[57] ABSTRACT

A bellows-type joint assembly for connecting tubular members to be connected together comprising a first short tubular joint section having integral connection means, a second or intermediate bellows joint section having integral connection means to be connected to said connection means of the first section, part of said connection means of the first joint section being connectable to one of said members to be connected together, and a third short tubular joint section having integral connection means to be connected to said connection means of the bellows joint section, part of said connection means of the third joint section being connectable to the other member of said members to be connected together.

2 Claims, 5 Drawing Figures

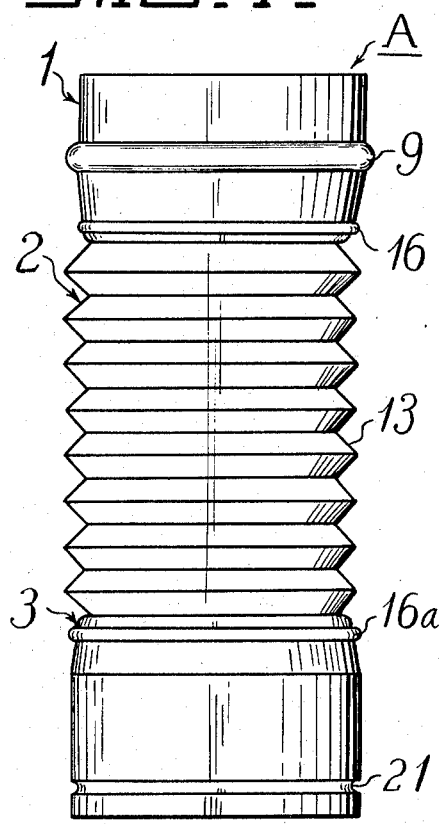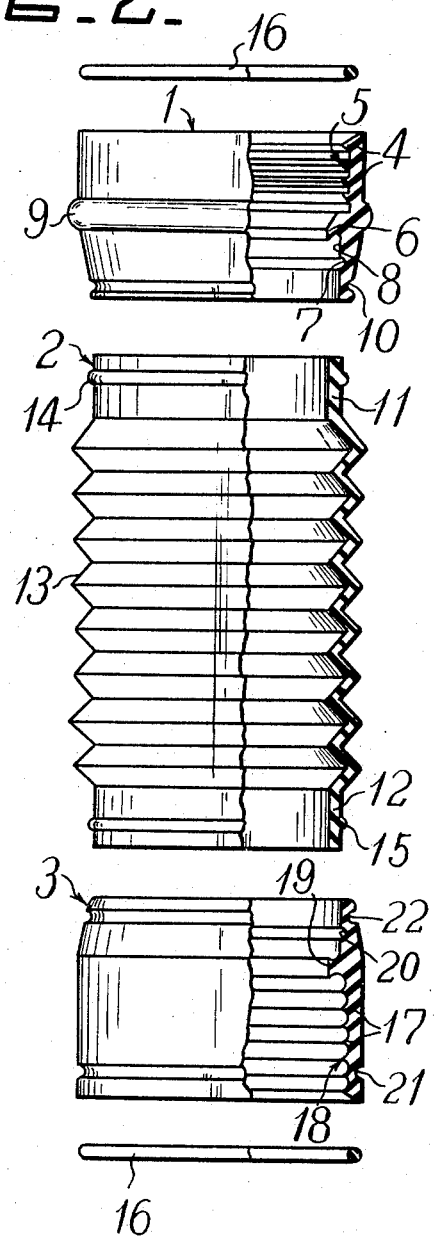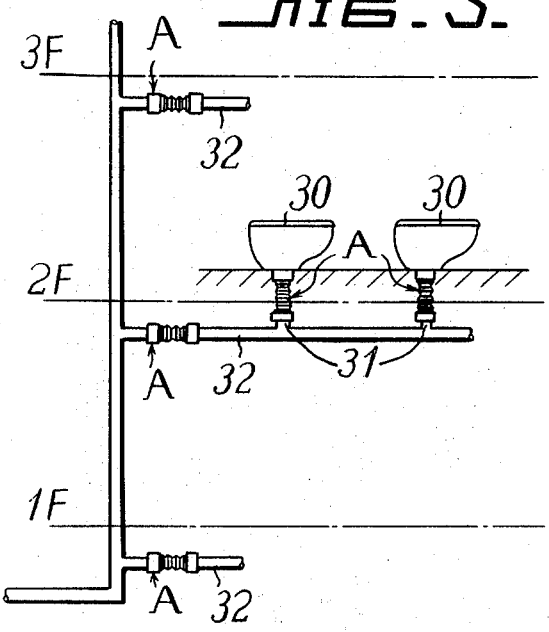

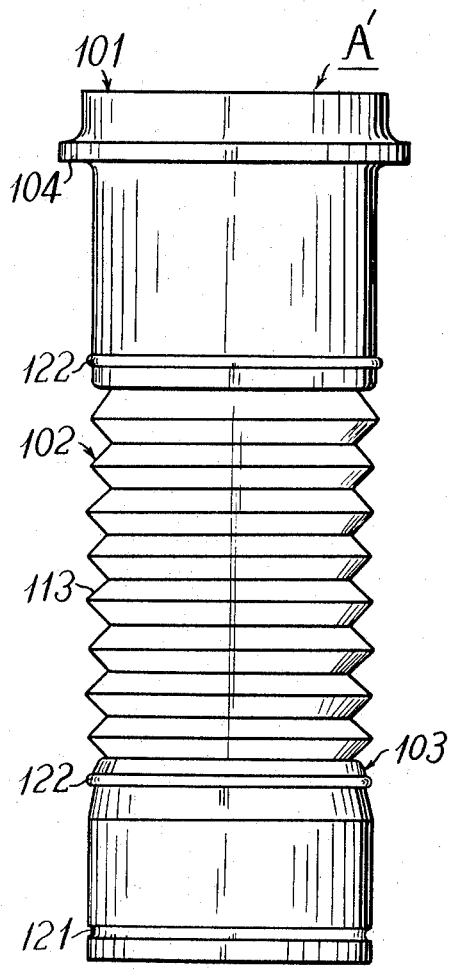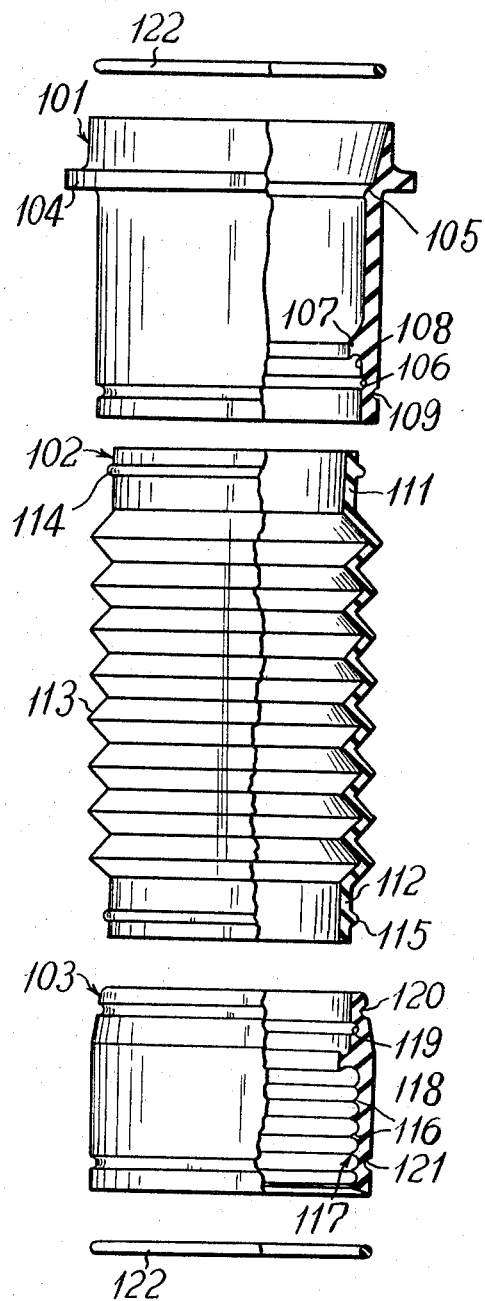

BELLOWS-TYPE JOINT ASSEMBLY

BACKGROUND OF THE INVENTION

This invention relates to a resilient tubular joint assembly and more particularly, to a resilient tubular bellows-type joint assembly comprising two shorter tubular joint sections and a longer bellows intermediate joint section interposed between and detachably connected to the short joint sections for fluid-tight connecting pipes in the piping system for wash basins, bath tubs, water closets and the like facilities in such a manner that even when the piping system is subjected to shock which may otherwise disconnect the pipes in the piping system from each other, the intermediate bellows joint section resiliently deflects to absorb such shock whereby the piping system is protected against possible damage and the pipes in the system can be maintained in their fluid-tightly connected condition.

In the construction of water-supply and drainage facilities such as laying of pipings for wash basins, bath tubs, water closets and the like in which the pipes are connected together by providing threads at the ends of the pipes to be connected together, threading tubular connector pipes having mating threads into the threaded ends of the pipes and applying adhesive or adhesive tapes connections.

However, wash basins, bath tubs and water closets are generally installed at areas in buildings where the work for connecting pipes in the pipings of such facilities are not easy to perform and the pipe connection operation requires a great deal of time and highly skilled hand. Furthermore, since most wash basins, bath tubs and water closets are formed of ceramics, they are very often insufficiently connected and as a result, fluid leakage frequently occurs in the connections between the connected pipes. Whenever the fluid-leaking connections are to be repaired, the floor adjacent to the wash basins, bath tubs and water closets has to be removed so that the fluid-leaking connections may be repaired and after the repair work has been done, the floor is reinstated requiring time-consuming operations.

In bath tubs and water closets when the discharge port of the bath tub or water closet collapses under the weight of the user, the connection between the discharge port and the associated drain piping or excretory piping comes loose resulting in water leakage.

Water leakage in the drain piping for wash basins, bath tubs and water closets in which a vast volume of water frequently flows through or at least some water is always standing is not desirable or not allowed to be left as it is from the sanitary point of view. Thus, joints for use in the drain piping for wash basins, bath tubs and water closets which connect pipes in such a drain piping in a brief period of time against water leakage without highly skilled hand have been longed for.

There have been proposed and practically employed a great variety of joints for use in connecting pipes in the piping system for wash basins, bath tubs and water closets and one of the conventional joints for such purpose comprises a joint for connecting a riser which extends from a base pipe positioned under the floor or a branch pipe connected to the riser with the discharge port of the wash basin, bath tub or water closet. However, the connection operation using such a prior art joint requires welding in the connection between the connected pipes and is inconvenient because such operation has to be done under the floor. And when the piping system including pipes connected together by such a prior joint is subjected to shock such as high or abnormal vibration or earthquake, a crack or cracks develop in the connection and/or some damage occurs in one or both of the connected pipes leading to water leakage. Especially, when the floor where the piping system is installed is made of concrete, it is not easy and inconvenient to repair such damages and such repair work is quite expensive.

And it has been known that metal or synthetic pipes are connected together by the employment of flanged metal joints, but the pipe connecting operation using the metal flanged joints is generally a time consuming work and the metal joints rust to a degree that the joints become unserviceable after a certain time period of service leading to water leakage.

SUMMARY OF THE INVENTION

Therefore, the present invention is to provide a novel and improved joint assembly which can effectively eliminate the disadvantages inherent in the prior art joints for use in connecting pipes in the piping system associated with wash basins, bath tubs, and water closets.

Another object of the present invention is to provide a joint assembly which simplifies pipe connection operation in water-supply and drainage piping systems, effectively seals the pipes in the piping systems against water-leakage and insures a long service life of the piping systems against damages due to shock such as earthquake.

Another object of the present invention is to provide a joint assembly which comprises short tubular joint sections formed of natural or synthetic rubber and a longer bellows section of the same material interposed between and detachably connected to the short joints and connects tubular members to be connected together by simply inserting one of the tubular members into one of the short joint sections and the other tubular member into the other short joint section thereby to provide water-tight connections.

Another object of the present invention is to provide a joint assembly in which the short tubular joint sections have connection means adapted to sealingly fit on the tubular members to be connected against inadvertent disconnection of the members thereby to provide water-tight connections.

Another object of the present invention is to provide a joint assembly which comprises short tubular joint sections and a longer bellows joint section all of which are separately formed and adapted to be detachably connected together so that the resulting joint assembly is employed for connecting tubular members together.

Another object of the present invention is to provide a joint assembly comprising separately formed and detachably connectable joint sections which have connection means integrally formed therewith and the connection means serve to connect between the joint sections as well as between members to be connected together by the joint assembly thereby to connect the members against inadvertent disconnection and water-leakage.

A further object of the present invention is to provide a joint assembly which includes a resilient bellows joint section which is adapted to resiliently deflects when a close-stool or bath tub which is one of members to be connected together is depressed down under the weight of the user or subjected to shock and resiliently so as to accommodate such depression or shock thereby to connect the members together against possible damage.

The above and other objects and attendant advantages of the present invention will be more readily apparent to those skilled in the art from a reading of the following detailed description of the invention in conjuction with the accompanying drawings which show preferred embodiments of the invention for illustration purpose only, but not for limiting the scope of the same in any way.

BRIEF DESCRIPTION OF THE DRAWINGS

FIG. 1 is an elevational view of one preferred embodiment of bellows-type joint assembly constructed in accordance with the present invention;

FIG. 2 is an exploded elevational view, with partially broken away, of said joint of FIG. 1;

FIG. 3 is a schematic view on a reduced scale showing one application of the joint;

FIG. 4 is an elevational view of a second embodiment of bellows-type joint assembly constructed in accordance with the present invention; and FIG. 5 is an exploded elevational view, with partially broken away, of the joint of FIG. 4.

PREFERRED EMBODIMENTS OF THE INVENTION

The present invention will be now described referring to the accompanying drawings and more particularly, to FIGS. 1 and 2 in which one or first embodiment of bellows-type joint assembly of the invention is shown. The joint assembly A comprises a first or uppermost joint section 1, a second or intermediate joint section 2 detachably connected at one or the upper end to the adjacent or lower end of the upper joint section 1 and a third or lowermost joint section 3 detachably connected at one or the upper end to the other or lower end of the intermediate joint section 2.

The uppermost joint section 1 is formed of resilient synthetic rubber and in the form of a short tube. The inner surface of the uppermost joint section 1 is formed with a plurality of vertically spaced annular projections 4 of triangular cross-section covering a distance from the upper end to an intermediate point of the height or length of the joint section to provide a connection portion 5 which is to be connected to the discharge port of a water basin, for example. The inner surface of the joint section 1 is further formed with an annular flange or projection 6 of trapezoidal cross-section at a point just below the lowermost one of the plural annular projections 4 and extends inwardly and radially from the joint section inner surface by a distance longer than the annular grooves 4. The flange 6 serves as a stopper as will be described hereinafter. The inner surface of the joint section 1 is further formed with an annular groove 7 at a point below the trapezoidal section flange 6 and the groove has an arcuate cross-section. The portion of the joint section inner surface below the flange 6 provides a second connection portion 8. The outer surface of the joint section 1 is formed with an annular reinforcing projection 9 at a position substantially corresponding to the flange 6 on the inner surface. The outer surface portion of the joint section 1 below the annular projection 9 tapers downwardly and is formed at a point adjacent to the lower end of the joint section 1 with an annular groove or recess 10 of arcuate cross-section for the purpose to be described hereinafter.

The intermediate joint section 2 is formed of the same material as that of the joint section 1 and is in the form of a tube longer than the joint section 1. The intermediate joint section 2 includes upper end portion 11 of substantially uniform diameter, a plain-surfaced lower end portion 12 of substantially the same uniform diameter as that of the end portion 11 and an intermediate bellows portion 13 extending between and integrally formed with the end portions 11, 12. The lower end portion 12 is longer than the upper end portion 11, but shorter than the intermediate bellows portion 13. The outer surface of the upper end portion 11 is formed with an annular projection 14 of arcuate cross-section. The outer surface of the lower end portion 12 of the intermediate joint section 2 is also formed with an annular groove 15 of arcuate cross-section. The outer diameter of the upper end portion 11 and the diameter of the annular groove 14 are so selected that when the upper most joint section 1 and intermediate joint section 2 are connected together, the upper end portion 11 and projection 14 snugly fit in the lower tapered portion of the upper joint section 1 and the annular groove 7, respectively. The insertion of the upper end portion 11 into the connection portion 8 of the uppermost joint section 1 is limited by the annular flange 6 on the joint section 1. After the two joint sections 1 and 2 have been connected together in the manner mentioned above, a rubber band 16 is placed into the annular recess 10 in the upper joint section 1 to further secure the connection between the joint sections.

The lower joint section 3 is formed of the same material as that of the joint sections 1 and 2 and is in the form of a tube. The inner surface of the lower joint section 3 is formed with a plurality of vertically spaced projections 17 of arcuate cross-section covering a distance from the lower end to an intermediate point of the height or length of the joint section to provide a connection portion 18 which is to be connected to a drain piping (not shown) associated with the water basin, for example. The inner surface of the lower joint section 3 is also formed with an annular flange or projection 19 at a point just above the uppermost one of the plural annular grooves 17 and with an annular recess or groove 20 of arcuate cross-section at a point above the groove 17. The outer surface of the lower joint section 3 is formed with an annular recess or groove 21 of arcuate cross-section at a point adjacent to the lower end of the joint section and the outer surface portion of the lower joint section 3 above the annular flange 20 tapers upwardly. The tapered upper portion of the joint section 3 is formed with an annular groove 22 or arcuate cross-section for the purpose to be described hereinafter. The inner diameter of the upper portion of the joint section 3 and the diameter of the annular recess 20 are so selected that when the lowermost joint section 3 is connected to the intermediate bellows joint section 2, the upper portion and groove 20 of the lowermost joint section 3 snugly receive the lower end portion 12 and the annular projection 15 of the intermediate joint section 2, respectively. The insertion of the lower end portion 12 of the intermediate joint section 2 is limited by the annular flange 19 of the lowermost joint section 3. After the joint sections 2 and 3 have been connected together in the manner mentioned above, a rubber band 16a is placed into the annular recess 22 to further insure the connection between the joint sections 2 and 3 whereby a unitary joint assembly comprising the three joint sections 1, 2 and 3 is formed.

The thus formed joint assembly A is then employed for connecting between the excretory end of a water closet 30 and an associated excretory duct 31, for example. For the purpose, the connection portion 5 of the uppermost joint section 1 is detachably fitted on the excretory end of the water closet 30 and the connection portion of the lowermost joint section 3 is detachably fitted on the excretory duct 31 as shown in FIG. 3. The insertion of the excretory end of the water closet 30 into the connection portion 5 of the uppermost joint section 1 and that of the excretory duct 31 into the connection portion 18 of the lowermost joint section 3 are limited by the annular flanges 6 and 19 on the joint sections 1 and 3, respectively. The connection between the joint section 3 and the excretory duct 31 is further assured by placing a rubber band similar to the rubber bands 16 and 16' into the annular groove 21 in the joint section 3. The above-mentioned connecting order may be altered as desired. For example, before the three joint sections are assembled together, the uppermost joint section 1 may be fitted on the excretory end and the lowermost joint section 3 may be fitted on the excretory duct 31. Thereafter, the opposite ends of the intermediate joint section 2 are connected to the adjacent ends of the uppermost and lowermost joint sections 1 and 3, respectively. Also as shown in FIG. 3, the joint assembly A may be employed in connecting pipe sections in the piping 32. In the application as shown in FIG. 3, the joint assembly can be employed for connecting pipe sections in a piping in a place where the pipe connecting operation is generally difficult to conduct or a limit space is available for the operation.

Referring now to FIGS. 4 and 5 which show a second embodiment of joint assembly of the invention. As in the case of the first embodiment, the modified joint assembly A' includes a first or uppermost joint section 101, a second or intermediate joint section 102 and a third or lowermost joint section 103 and these joint sections are formed of the same resilient synthetic rubber or the like material.

The uppermost joint section 101 is in the form of a tube and includes an upper larger diameter portion which flares downwardly and terminates at an annular reinforcing flange 104 and a lower smaller diameter portion extending downwardly from the flange 104 and formed with integrally with the upper portion. An annular shoulder 105 is formed on the inner surface of the uppermost joint section at the juncture between the larger and smaller diameter portions which serves as a stopper as will be described hereinafter. The inner surface of the smaller diameter portion of the uppermost joint section 101 is formed with an annular recess or groove 106 of arcuate cross-section at a point adjacent to the lower end of the joint section lower portion. The inner surface of the joint section lower portion is also provided with an annular projection of flange 107 of trapezoidal cross-section at a point above the annular groove 106 thereby to provide a connecting portion 108. The annular projection 107 also serves as a stop as will be apparent hereinafter. The outer surface of the lower smaller diameter portion of the joint section 101 is formed with an annular recess or groove 109 in substantially a position corresponding to the inner groove 106.

The intermediate joint section 102 is identical with the counterpart of the first embodiment, that is, the joint section is in the form of a tube longer than the joint section 101 and includes a plain-surfaced upper end portion 111 of substantially uniform diameter, a plain-surfaced lower end portion 112 of substantially uniform diameter and an intermediate bellows portion 113 which is integrally connected at the opposite ends to the two end portions 111 and 112. As in the case of the first embodiment, the end portions 111 and 112 have the same diameter and the intermediate or bellows portion 113 has a diameter greater than that of the end portions. The outer surface of the end portion 111 is formed with an annular projection 114 of arcuate cross-section and similarly, the outer surface of the end portion 112 is also formed with an annular projection 115 of arcuate cross-section.

The lowermost joint section 103 is also identical with the counterpart of the first embodiment, that is, the joint section is in the form of a tube shorter than the uppermost joint section 101. The inner surface of the lowermost joint section 103 is formed with a plurality of vertically spaced projections 116 of arcuate cross-section covering a distance from the lower end to an intermediate point of the height or length of the joint section to provide a connection portion 117 which is to be connected to one of members to be connected together by the joint assembly of the invention. The inner surface of the lowermost joint section is also formed at a point just above the uppermost one of the plural annular grooves 116 with an annular flange or projection 118 which extends inwardly and radially by a distance greater than the annular grooves 116 so as to serve as a stopper. The inner surface of the lowermost joint section 103 is further provided with an annular groove 119 at a point above the flange 118 for receiving the annular projection 115 on the lower end portion 112 of the intermediate or bellows portion 102 when the two joint sections are connected together in the same manner as mentioned in connection with the connection between the counterparts of the first embodiment. The outer surface of the lowermost joint section 103 is formed at a point adjacent to the upper end with an annular groove 120 of arcuate cross-section and at a point adjacent to the lower end with an annular groove 121 of arcuate cross-section. The three joint sections 101, 102 and 103 are connected together in the same manner as mentioned in connection with the counterparts of the first embodiment and after the joint sections have been assembled, rubber bands 122 are placed into the annular grooves 109, 120, 121, respectively to secure the assembly of the three sections. If desired, any suitable adhesive may be applied to the connections in order to enhance the securement.

As clear from the foregoing description, since the joint sections formed of resilient material such as rubber are connected in any desired order to provide an integral joint assembly and the inner surfaces of these joint sections are integrally formed with the annular grooves and projections to provide complementary connection portions, the joint sections can be rigidly and air-tightly connected together without resorting to the conventional means such as screwing-in. And since the joint assembly comprises a plurality of resilient elements or sections detachably connected together, the joint assembly can be employed at a limited space area or inconvenient job site where pipe laying operation is not easy. Furthermore, since the bellows joint section is interposed between the substantially plain-surfaced joint sections, the joint assembly can accommodate varying distances between the excretory end of a water closet and the associated excretory duct and even when the excretory end is depressed down under the weight of the water closet the water closet can be effectively protected against possible damage.

Although the best mode contemplated for carrying out the present invention has been herein shown and described, it will be apparent to those skilled in the art that various modifications and variations may be made without departing from what is regarded to be the subject matter of the invention.

What is claimed is:

1. A bellows-type joint assembly for connecting between tubular members to be connected together comprising a first resilient tubular joint section having connecting means, a second resilient intermediate tubular bellows joint section detachably connected to said first joint section and having connecting means and a third resilient tubular joint section detachably connected to said intermediate bellows joint section and having connecting means in which said connecting means of the first joint section includes a plurality of spaced annular projections of triangular cross-section formed on the inner surface of said first joint section covering a distance from one end to an intermediate point along the length of the joint section for receiving one of said tubular members to be connected, an annular flange of trapezoidal cross-section formed on the inner surface of said first joint section at a point below the lower most one of said plural projections and an annular recess formed in the inner surface of said first joint section at a point below said flange, said connecting means of the second intermediate joint section includes an annular projection of arcuate cross-section formed on the outer surface of the joint section at a point adjacent to one end thereof to be received in said annular recess of the first joint section and a similar annular projection of arcuate cross-section formed on the outer surface of said intermediate joint section at a point adjacent to the other end of the joint section and, said connecting means of the third joint section including an annular recess formed on the inner surface of the joint section for receiving said annular projection on the outer surface of the intermediate joint section at the other end of the latter and a plurality of spaced annular projections of arcuate cross-section formed on the inner surface of the joint section for receiving the other tubular member of the members to be connected together.

2. The bellows-type joint assembly as set forth in claim 1, in which said intermediate joint section includes one end portion on the outer surface of which said first-mentioned annular projection is formed, a second end portion on the outer surface of which said second-mentioned annular projection is formed and an intermediate bellows portion extending between and integrally formed with said first and second end portions.

* * * * *